March 21, 1933. G. WILLMANN 1,902,272
WAFER DOSING, FILLING, AND SEALING MACHINE
Filed June 2, 1930 6 Sheets-Sheet 1
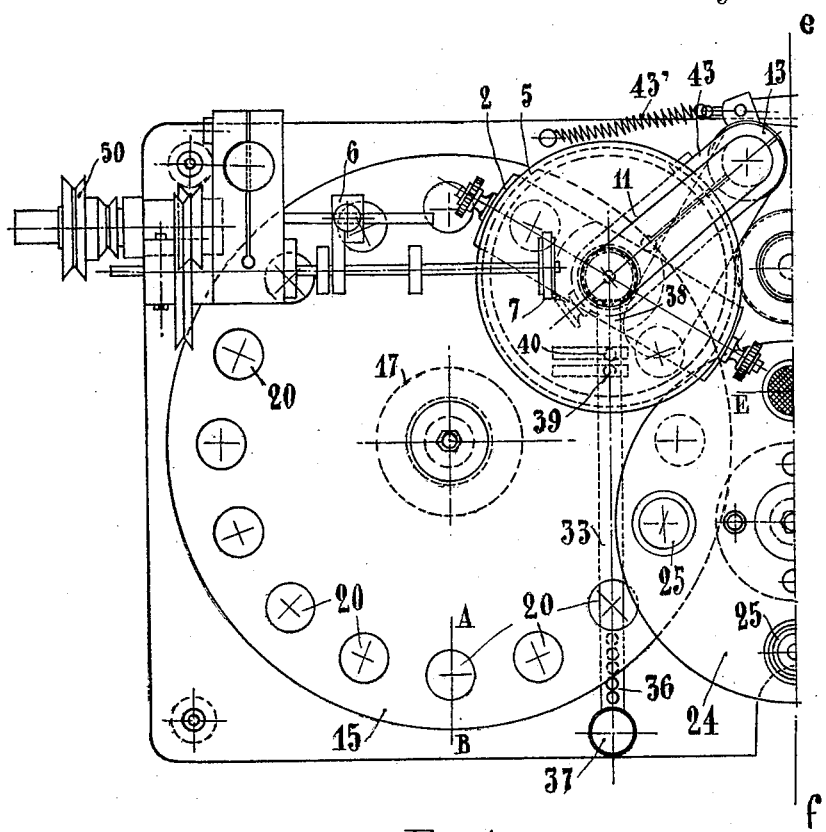
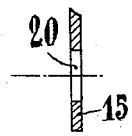
INVENTOR
Gustave Willmann
BY
Andrew T. Dupont
his ATTORNEY March 21, 1933. G. WILLMANN 1,902,272
WAFER DOSING, FILLING, AND SEALING MACHINE
Filed June 2, 1930  6 Sheets-Sheet 2

INVENTOR
Gustave Willmann
BY
Andrew T. Dupont
his ATTORNEY

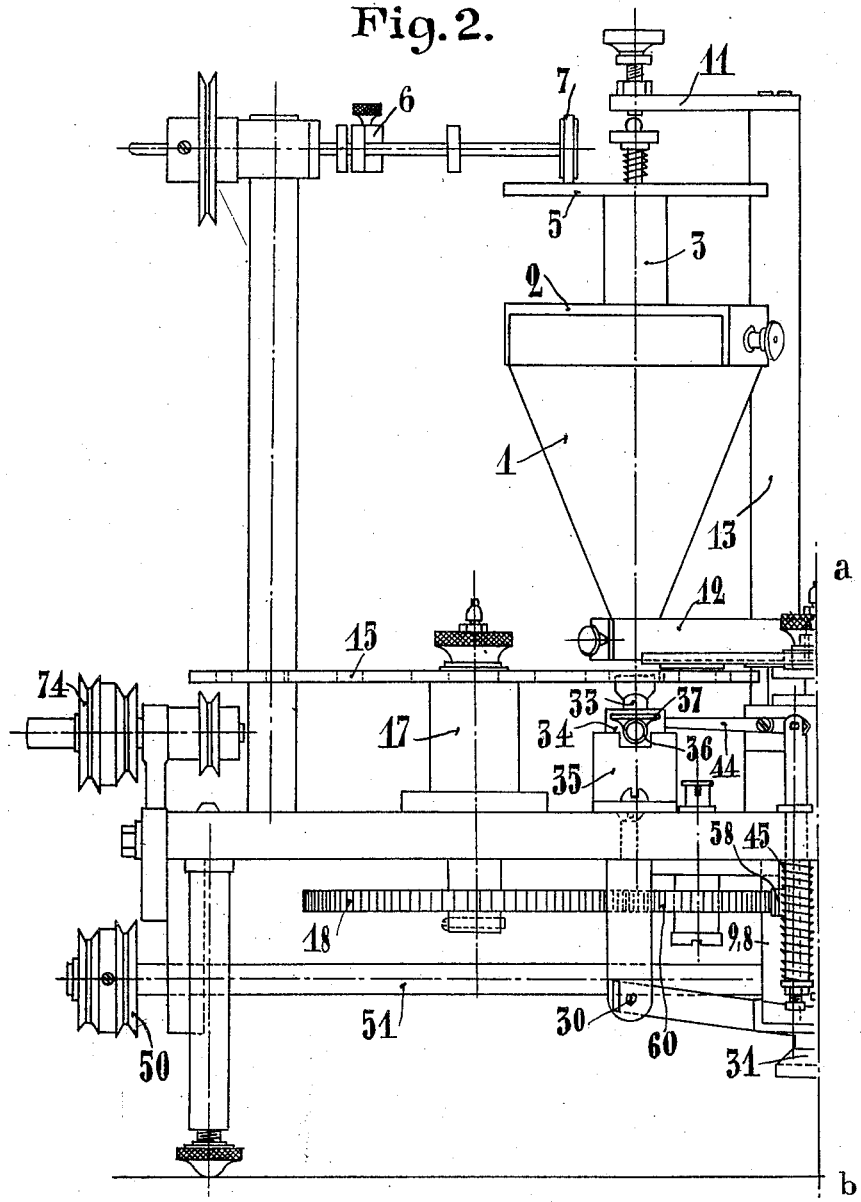

March 21, 1933. G. WILLMANN 1,902,272
WAFER DOSING, FILLING, AND SEALING MACHINE
Filed June 2, 1930 6 Sheets-Sheet 4

INVENTOR
Gustave Willmann
BY
Andrew T. Dupont
his ATTORNEY

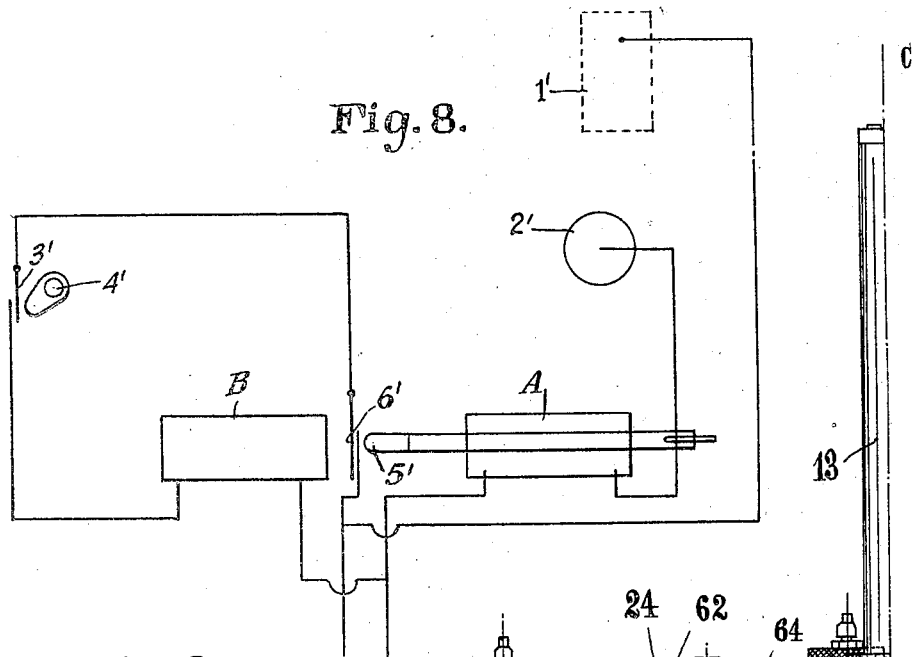
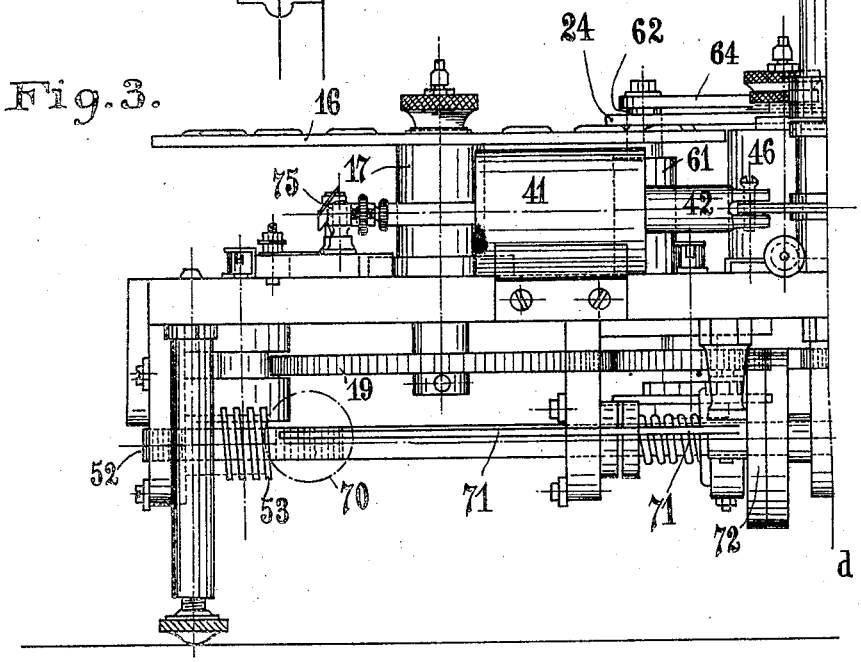

March 21, 1933.  G. WILLMANN  1,902,272
WAFER DOSING, FILLING, AND SEALING MACHINE
Filed June 2, 1930    6 Sheets-Sheet 6
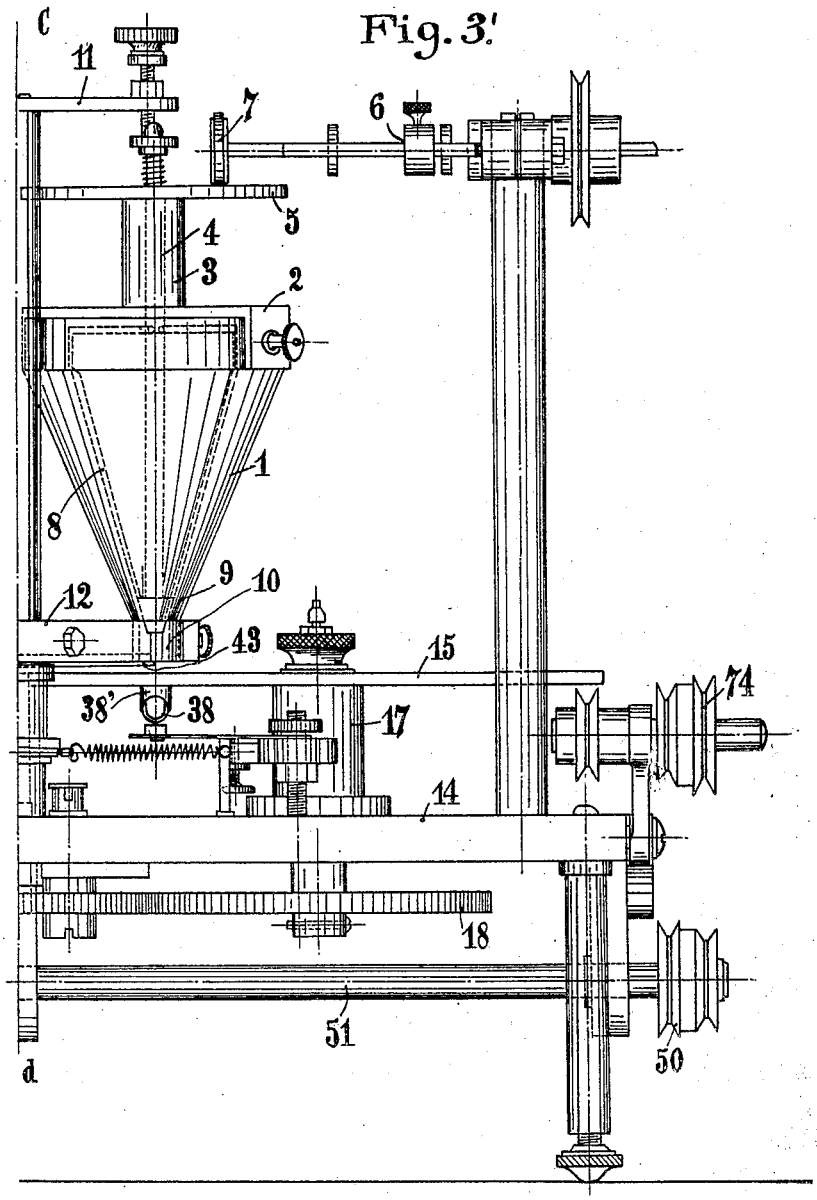

Patented Mar. 21, 1933

1,902,272

UNITED STATES PATENT OFFICE

GUSTAVE WILLMANN, OF PARIS, FRANCE

WAFER DOSING, FILLING, AND SEALING MACHINE

Application filed June 2, 1930, Serial No. 458,987, and in France June 5, 1929.

This invention has for its object a machine for suitably dosing, filling and sealing medicine wafers of any desired shape and size.

The invention comprises a machine for dosing, filling and sealing wafers wherein a hopper brings the powder to be packed into a wafer half carried by a balance which, when it reaches its position of equilibrium, electromagnetically closes the bottom of the hopper and wherein two discs rotating in opposite directions carry the upper and lower wafer halves characterized in that above the said discs is movable a small disc with four sockets, which is given successively an axial movement and a quarter turn in the same direction as the disc carrying the upper wafer halves, the axial movement having for its object to bring an upper wafer half on the corresponding boss on the disc to bring the upper wafer half previously taken into contact with a moistener to bring the upper wafer half moistened in the preceding operation on to a lower wafer half previously dosed with the powder, disposed in the corresponding recess of the disc carrying the lower wafer halves and to liberate the completed wafer from the preceding operation by an ejector disc with a single axial movement.

One embodiment of the invention is shown, by way of example, in the appended drawings, wherein:

Figures 1 and 1' are a top plan view;

Figures 2 and 2' are a front elevational view;

Figures 3 and 3' are a rear elevational view;

Figure 4 is a cross sectional view taken on line A—B in Figure 1;

Figure 1:
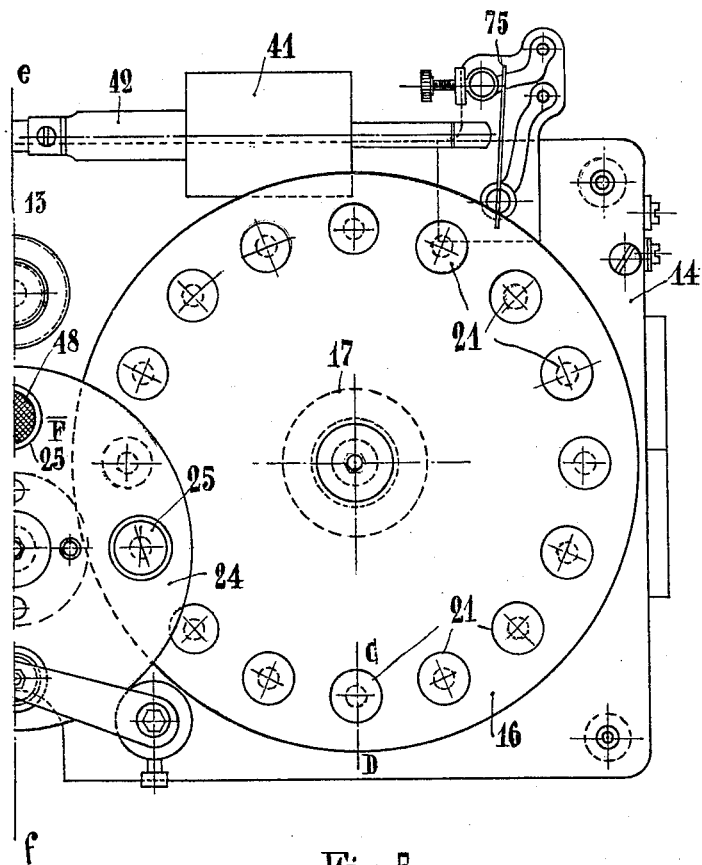
Figure 6:
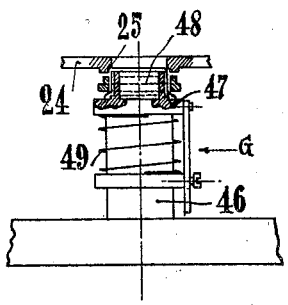
Figures 6 and 7 show details of the moistener.
Figure 7:
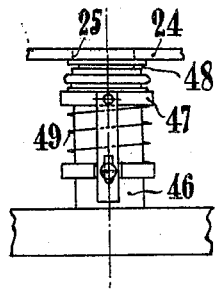
Figure 5:
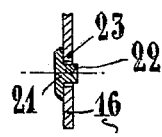
Figure 5 is a cross sectional view taken on line C—D in Figure 1.
Figure 9:
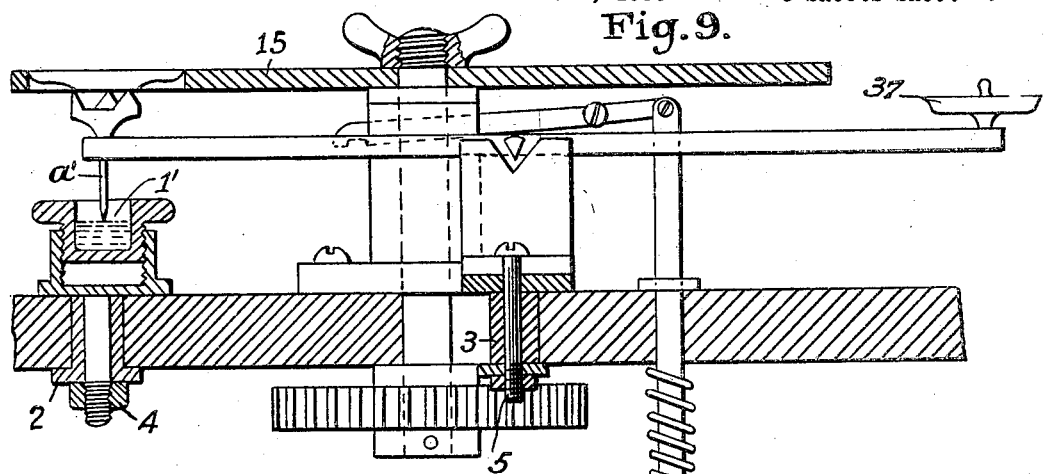
Figure 2:
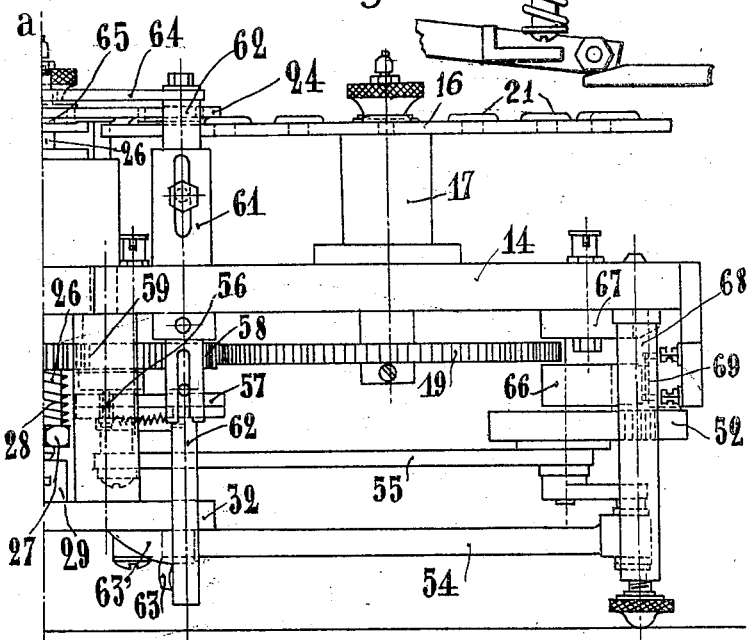
Figure 10:

Figure 8 indicates the electrical circuits of the controlling electro-magnets;

Figure 9 is a section through the balance controlled by the electro-magnets; and, Figure 10 is a vertical section through a half wafer.

The machine comprises a hopper-like reservoir 1, which contains the powder to be distributed; the said hopper has secured on it a bridge 2, which carries a hollow hub 3 which receives a shaft 4 which has secured on it a friction disc 5 driven by means of a friction roller 7 adjustable radially of the disc by means of a sleeve 6, whereby different speeds of the disc 5 may be secured depending on the distance of the roller from the center of the disc. The shaft 4, moreover, carries a device 8 adapted to scrape the inside of the hopper 1 in order to facilitate the mixing and feeding of the powder. The shaft 4 is formed at its lower end with an adjustable spindle valve 9 which allows the orifice 10 of the hopper 1 to be opened to a greater or less degree.

The distributor is mounted between a pair of brackets 11 and 12 secured to an upright 13 rigid with the frame 14, the upper bracket 11 being swingably mounted to allow the device to be taken down as a whole.

A pair of discs 15 and 16 adapted to rotate in opposite directions on their respective supports 17 secured on the frame 14 are driven by means of toothed wheels 18 and 19 respectively.

The disc 15 is formed with a definite number of recesses 20 adapted to receive the lower halves of the wafers.

The other disc 16 carries as many bosses 21 as there are recesses in the disc 15; the said bosses 21 are provided with studs 22 adapted to be firmly fitted into corresponding holes 23 drilled in the disc 16, whereby it is possible to replace the said bosses which are intended to support the upper halves of the wafers.

A small disc 24 has secured in it four annular sockets 25, the internal diameter of which is equal to the diameter of the upper wafer halves. The disc 24 is carried on a spindle 26, one end 27 of which is permanently pressed by a spring 28 against a member 29 pivoted at 30, which is at all times held in contact with a suitably shaped rib 31 formed on top of a rotary disc 32.

Arranged at 61 is a member in which there is slidably mounted a rod 62, which is permanently urged downwards by a spring housed in the member 61; the said rod 62 carries at its lower portion a roller 63 adapted to run on a rib 63' formed on the lower face of the disc 32; the said rod 62 has secured at the upper portion thereof a member 64 provided at its free end with an ejector disc 65.

A balance 33 the knife edges 34 of which bear upon a member 35 rigid with the frame 14 carries at the free end of the beam 36 a dish 37 in which a weight is placed that is equal to the weight of one wafer half plus the dose of powder to be deposited therein; the free end of the other beam 38 is provided with a support 38' which, as the system is still out of balance, will raise the wafer half on the disc 15 thereabove, in which case the powder will fall into the said half. As soon as the system attains a state of balance, the beam 38 at contacts 39 and 40 closes an electric circuit in which a magnet 41 is connected that will attract a steel rod 42 which causes a plate 43 to swing about the upright 13, thus resulting in the said plate 43 closing the orifice 10 of the hopper 1. A spring 43' urges the plate 43 away from the said orifice 10.

A rod 44 locks the balance at the desired time; the said rod, which is urged upwards by a spring 45, is pressed downwards by the member 29, above referred to.

A moistener 46, consisting of a container, has a sliding portion 47 which carries a wick 48 which, by the action of capillarity, provides for the moistening of the upper wafer halves, said sliding portion 47 being submitted to the action of a return spring 49.

The motion of the whole structure is imparted by a pulley 50 keyed on a shaft 51 which transmits it to a toothed wheel 52 by means of a worm shaft 53.

The said wheel 52 carries a pair of rods 54 and 55, one of which 54 drives the disc 32, while the other 55 imparts a reciprocating motion to a pawl 56 which shifts a two-part disc 57 adapted to drive a toothed wheel 58 carried by the same shaft 59. The toothed wheel 58 drives both toothed wheels 18 and 19 through the intermediary of a pair of additional toothed wheels 60.

In addition to the toothed wheel 52, the shaft 66 carries a hard rubber disc 67 formed with a boss 68 adapted at a given time to depress a tongue 69 which closes an electric circuit parallel to the first circuit in which a magnet 70 is connected which attracts a steel blade 71 adapted to disengage a coupling device 72 carried by the shaft 51.

The said circuit comprises an additional switch 75, which is open when the magnet 41 is energized and closed when the said magnet 41 is currentless.

The roller 7, above referred to, is driven from the belt on pulley 50 through the second motion pulley 74.

The machine operates as follows:

The discs 15 and 16, having an equal number of recesses 20 or bosses 21 which correspond to that of wafers to be made, are first fitted on the machine. A wafer half is then placed on each boss 21 and in each recess 20, after which the powder to be enclosed in the wafers is charged into the hopper 1; a weight is deposited in the dish 37 of the balance, which is equal to the weight of the dose of powder to be enclosed in the wafer plus the weight of the lower wafer half.

Under the orifice 10 of the hopper 1 is situated the support 38' of the balance carrying the lower wafer half on the disc 15. When the orifice 10 of the hopper 1 is open, the powder flows into the wafer half until the position of equilibrium is obtained, whereupon the beam of the balance closes the circuit to energize the electro-magnet 41, which closes the orifice of the hopper and stops the movement of the discs 15, 16 and 24. Between the two discs 15, 16, which turn in opposite directions, turns the small disc 24, which rotates in the same direction as the disc 16 and above the discs 15, 16.

The disc 24 is successively given an axial movement and a rotation through 90°. The axial movement has for its object to bring by means of a socket 25 and upper wafer half on the corresponding boss on the disc 16 when the machine commences to function. Thereupon the disc 24 is raised again, turns through 90° and re-descends to bring the wafer which it has carried into contact with the moistener 46. At the same time, the following socket of the disc 24 places a wafer half on the disc 16. Subsequently, the disc ascends, makes a further quarter turn and re-descends to bring the upper wafer half taken at the commencement of the operation on to the lower wafer half filled with the powder from the hopper so as to complete the wafer. At the same time, it brings the upper wafer half on the disc 16 to the moistener and by its third socket carries an upper wafer half on to the disc 16.

In a third operation, the disc 24 in rising carries the completed wafer as well as the following moistened upper half wafer and the half wafer carried by the third socket of the disc 16, moves a quarter turn, brings the completed wafer in front of an ejector disc 65, which releases it from its socket, and re-descends, the following socket on the disc 24 sealing and taking the wafer half filled with the powder, the third moistening the wafer half in position above the moistener, while the fourth socket takes another wafer half on the disc 16, and so on. The operation of the four sockets 25 of the disc 24 may thus be easily followed. The disc 24, by its axial and quarter turn movements, successively takes the upper wafer half, moistens it, seals it on the lower wafer half, filled with the powder, and finally brings it before the ejector, which liberates it from the disc 24.

The different movements of the machine, according to the invention, are obtained from the pulley 50, which drives the toothed wheel 52 through the shaft 51 and the worm shaft 53; the rod 55 shifts the pawl 56 backwards, the discs 15, 16 and 24 thus being locked in their positions; the rod 54 rotates the disc 32, the rib 31 drops the shaft 26 together with the disc 24; one of the sockets 25 encircles the upper wafer half on one of the bosses 21 on the disc 16 therebelow. At the same time, the rod 44 will release the balance 33 which, being in unbalanced state, allows the beam 36 to swing upwards, the support 38' of the same then lifting the lower wafer half on the disc 15 thereabove; at the same time, the beam 36 will open the circuit between contacts 39 and 40; as the magnet 41 becomes de-energized, the spring 43' shifts the plate 43 clear of the orifice 10 and the powder drops into the wafer; by the time the required amount of powder has fallen therein, the balance 33 attains its state of equilibrium and the beam 36 on being swung downwardly will close again the circuit between contacts 39, 40, whereupon the magnet 41 is re-energized and will attract the rod 42 by which the plate 43 is returned to its position under the orifice 10 of the hopper 1.

While the operation described above is taking place the disc 32 continues to rotate and thereby lifts again the member 29, which in turn lifts on one hand the beam 36, thus locking the balance 33, and on the other hand the disc 24, which in one of the sockets 25 will carry away the upper wafer half it encircles on the disc 16; at this moment, the lever 55 returns the pawl 56 which rotates the disc 24 through a quarter of a revolution and both discs 15 and 16 through 1/nth of a revolution, n being the number of recesses 20 or bosses 21.

Thereafter, the same operation will be repeated, that is, the disc 24 is lowered again, picks up a wafer half from the disc 16 and moistens the wafer half picked up at the next preceding cycle on the wick of the moistener 46, while the balance weighs out the dose to be deposited into the next succeeding wafer half on the disc 15.

The disc 24 is lifted again, the balance 33 becomes locked again, and the discs 15, 16 and 24 are swung through the same angle as before.

As the disc 24 is lowered again, it picks up another upper wafer half, moistens the one picked up in the next preceding cycle and lays the one picked up in the first instance onto the first lower wafer half now filled with powder, both halves thus being sealed to each other; as the disc 24 is raised anew, it carries away the finished wafer while the disc 65, which is given a vertical ascending and descending motion at each cycle by the rib 63 on disc 32, will at its next succeeding cycle disengage the finished wafer from the disc 24 while the next succeeding wafer will undergo its sealing operation.

If, for any reason, the discs 15, 16 and 24 should happen to be operated while no charge is fed into the lower half, i. e., while the balance has not yet reached its position of equilibrium and the magnet 41 has not shifted the plate 43 back under the orifice 10, then the bosses 68 on disc 67, on the one hand, would close the circuit of the magnet 70 by pressure upon the blade 69, which circuit is already closed at switch 75 as the magnet 41 remained unoperated; the magnet 70 is then energized and attracts the rod 71 which disengages the coupling 72, the machine thus being brought to rest.

It will be seen, as explained above, that the distributing operation of the machine, which is continuous, ceases to supply the powder when the closing valve comes into play at the bottom of the screen.

The distributing mechanism works intermittently since the clutching operates, at each turn, when the balance receiving the powder in the lower half wafer is in equilibrium. On the contrary, after the weighing is done, the circuit of the electro-magnet B, shown in Figure 8, is open due to the energization of the magnet B, thus causing the valve to close while the machine continues in operation.

In Figure 8 has been shown a wiring diagram for the magnets corresponding to those described above. 1' represents the support for the balance, which is insulated from the machine, 2' the mercury contact, which is also mounted so as to be insulated from the machine, 3' is a spring contact, 4' is a cam driven by the machine and controlling the make and break of the circuit to the electro-magnet B, which controls the declutching, 5' is the insulated end of the armature of electro-magnet A, 6' is another spring contact. The armature of the electro-magnet A, when closing the distributor, opens the energizing circuit of electro-magnet B through spring contact 6'. As is evident, B is the de-clutching magnet, while A operates the valve which controls the powder distributor. It will be seen that when the balance is in equilibrium, it closes the circuit to the magnet A by means of its beam, at which time the circuit to the de-clutching magnet B is opened, thus permitting the rotation of the discs. During this rotation, the balance is locked by means of the small lever 44 controlled by a suitable cam. This lever subsequently frees the balance, and the latter, being carried by the weight of the wafer, opens the circuit to the valve and raises the next empty wafer half ready to receive its portion of the powder.

As shown in Figure 9, the mercury contact 1' may be regulated so as to increase or decrease the distance between the point a' and the level of the mercury. In this manner, it may be possible to control the distribution of the powder and to reduce the time for declutching while the balance prevents operation of the machine.

The energizing circuit of the electro-magnet A is opened or closed, as previously explained, by the beam of the balance, which, when in equilibrium, causes contact with the mercury at 1' and closes the circuit to the magnet A, thus operating the valve controlling the powder and opening the circuit to magnet B, if it is closed, with the result that the drive or clutching is resumed.

Having now particularly described and ascertained the nature of my said invention and in what manner the same is to be performed, I declare that what I claim is:

1. A machine for dosing, filling and sealing wafers, comprising a powder hopper having a closure at the lower end thereof, a balance for measuring predetermined quantities of the powder fed by the hopper to a wafer-half, electro-magnetic means for operating the said closure when the balance reaches a position of equilibrium, a pair of discs, one of said discs having bosses to carry the upper wafer-halves, and the other of said discs having recesses to carry the lower wafer-halves, means for rotating said discs in opposite directions, a moistener, an additional disc above said first mentioned discs having a plurality of sockets therein, means for imparting said additional disc, sequentially, with an axial movement and a quarter turn in the direction in which the disc carrying the upper wafer-halves rotates, whereby said pair of discs and additional disc cooperate to bring an upper wafer-half on its corresponding boss on one of the pair of discs, to bring the upper wafer-half previously taken in contact with the aforementioned moistener and to bring the upper wafer-half moistened in the preceding operation on to a lower half previously dosed with the powder, an ejector disc, and means for operating said ejector disc to free the completed wafer from the preceding operation with a single axial movement.

2. A machine as claimed in claim 1, in which the axial movement of the additional disc and the intermittent rotary movements of the discs carrying the wafer halves and the additional disc are obtained from a driving wheel by cranks mounted thereon, one of which comprises a ratchet driving said discs through toothed gearing, while the other controls the axial movement by means of a cam and disc.

3. A machine as claimed in claim 1, in which the disc carrying the upper wafer halves is provided with circumferential recesses in which are disposed the bosses 21 receiving the upper wafer halves.

4. A machine as claimed in claim 1, in which the lower wafer halves are raised by the end of the balance beam which, in its position of equilibrium, closes the electro-magnetic circuit, obturating the hopper and stopping the movement of the discs, and is locked by a rod controlled by the said cam and disc.

5. A machine for dosing, filling and sealing wafers, comprising a powder hopper having a closure at the lower end thereof, a balance for measuring predetermined quantities of the powder fed by the hopper to a wafer-half, electro-magnetic means for operating the said closure when the balance reaches a position of equilibrium, a pair of discs, respectively carrying cooperating wafer-halves, means for rotating said discs in opposite directions, a moistener, an additional disc, means for imparting said additional disc, sequentially, with an axial movement and a quarter turn, whereby all of said discs cooperate in the assembly of the wafer-halves, the means for imparting the above mentioned axial movement to the additional disc and the intermittent rotary movement to the pair of discs comprising a driving wheel, cranks mounted thereon, one of which includes a ratchet and toothed gearing and the other of which includes a cam and disc, in combination with a shaft on which said driving wheel is mounted, a coupling device on said shaft, a rubber disc on said shaft having a boss thereon, and a tongue adapted to cooperate with said boss to close an electric circuit controlling said coupling device.

6. A machine according to claim 5, in which the electric circuits are arranged in such manner that at each turn of the driving wheel the machine has a period of rest, if the balance has not taken its position of equilibrium under the weight of the medicinal substance, in order to establish the coupling circuit.

In testimony whereof I affix my signature.

GUSTAVE WILLMANN.